United States Patent
Hu et al.

(10) Patent No.: US 11,481,916 B2
(45) Date of Patent: Oct. 25, 2022

(54) METHOD, SYSTEM AND COMPUTER PROGRAM PRODUCT FOR EMULATING DEPTH DATA OF A THREE-DIMENSIONAL CAMERA DEVICE

(71) Applicant: MOTOROLA SOLUTIONS, INC., Chicago, IL (US)

(72) Inventors: Yanyan Hu, Woburn, MA (US); Kevin Piette, Carlisle, MA (US); Pietro Russo, Melrose, MA (US); Mahesh Saptharishi, Sudbury, MA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 270 days.

(21) Appl. No.: 16/712,349

(22) Filed: Dec. 12, 2019

(65) Prior Publication Data
US 2021/0183091 A1   Jun. 17, 2021

(51) Int. Cl.
*G06T 7/593* (2017.01)
*G06T 7/80* (2017.01)
(Continued)

(52) U.S. Cl.
CPC .............. *G06T 7/593* (2017.01); *G01S 7/417* (2013.01); *G01S 13/42* (2013.01); *G01S 13/867* (2013.01);
(Continued)

(58) Field of Classification Search
None
See application file for complete search history.

(56) References Cited

U.S. PATENT DOCUMENTS 6,366,236 B1   4/2002  Farmer et al.
10,474,160 B2 *  11/2019  Huang ...................... G06T 3/40
(Continued)

FOREIGN PATENT DOCUMENTS

| CN | 106981080 A | 7/2017 |
| CN | 108416290 A | 8/2018 |
| CN | 108596979 A | 9/2018 |

OTHER PUBLICATIONS

K. G. Lore, K. Reddy, M. Giering and E. A. Bernal, "Generative Adversarial Networks for Depth Map Estimation from RGB Video," 2018 IEEE/CVF Conference on Computer Vision and Pattern Recognition Workshops (CVPRW), Salt Lake City, UT, 2018, pp. 1258-12588.
(Continued)

*Primary Examiner* — Tahmina N Ansari

(57) ABSTRACT

A method, system and computer program product for emulating depth data of a three-dimensional camera device is disclosed. The method includes concurrently operating the radar device and the 3D camera device to generate training radar data and training depth data respectively. Each of the radar device and the 3D camera device has a respective field of view. The field of view of the radar device overlaps the field of view of the 3D camera device. The method also includes inputting the training radar and depth data to the
(Continued)

neural network. The method also includes employing the training radar and depth data to train the neural network. Once trained, the neural network is configured to receive real radar data as input and to output substitute depth data.

19 Claims, 4 Drawing Sheets

(51) Int. Cl.
*G06N 3/04* (2006.01)
*H04N 13/271* (2018.01)
*H04N 13/239* (2018.01)
*G01S 7/41* (2006.01)
*G01S 13/42* (2006.01)
*G01S 13/86* (2006.01)
*G06N 3/08* (2006.01)

(52) U.S. Cl.
CPC .............. *G06N 3/04* (2013.01); *G06N 3/08* (2013.01); *G06T 7/85* (2017.01); *H04N 13/239* (2018.05); *H04N 13/271* (2018.05); *G06T 2207/10012* (2013.01); *G06T 2207/10028* (2013.01); *G06T 2207/20081* (2013.01)

(56) References Cited

U.S. PATENT DOCUMENTS

| | | | |
|---|---|---|---|
| 10,671,082 B2* | 6/2020 | Huang | G06N 3/0454 |
| 2018/0231871 A1* | 8/2018 | Wang | G06K 9/00208 |
| 2019/0204834 A1* | 7/2019 | Harrison | G01S 17/58 |
| 2019/0279366 A1* | 9/2019 | Sick | G06K 9/6256 |
| 2021/0183091 A1* | 6/2021 | Hu | G01S 13/42 |
| 2021/0192762 A1* | 6/2021 | Guan | G06V 20/647 |

OTHER PUBLICATIONS

M. Zhao et al., "Through-Wall Human Pose Estimation Using Radio Signals," 2018 IEEE/CVF Conference on Computer Vision and Pattern Recognition, Salt Lake City, UT, 2018, pp. 7356-7365.

Shi Lei Fu et al: "Reciprocal Translation between SAR and Optical Remote Sensing Images with Cascaded-Residual Adversarial Networks", arxiv.org, Cornell University Library, 201 Olin Library Cornell University Ithaca, NY 14853, Jan. 24, 2019 (Jan. 24, 2019), XP081007561, all pages.

The International Search Report and the Written Opinion corresponding patent application No. PCT/US2020/061730 filed: Nov. 23, 2020, dated Feb. 23, 2021, all pages.

* cited by examiner

METHOD, SYSTEM AND COMPUTER PROGRAM PRODUCT FOR EMULATING DEPTH DATA OF A THREE-DIMENSIONAL CAMERA DEVICE

BACKGROUND

Radar devices are used in a wide variety of different industries. One example of these industries is the security industry. For instance, in the security industry a radar device is sometimes chosen over a video camera in locations like ATMs, change rooms, etc. where privacy concerns weigh against capturing traditional video images. Radar devices tend to work well under any light conditions; however radar data may be algorithmically complex to analyze.

Unlike their two-dimensional counterparts, three-dimensional video cameras are much less common in the various consumer, commercial and industrial settings within which video cameras are used. The typical off-the-shelf video camera does not generate depth data. By contrast however, a three-dimensional video camera does generate depth data, which can be very useful.

BRIEF DESCRIPTION OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
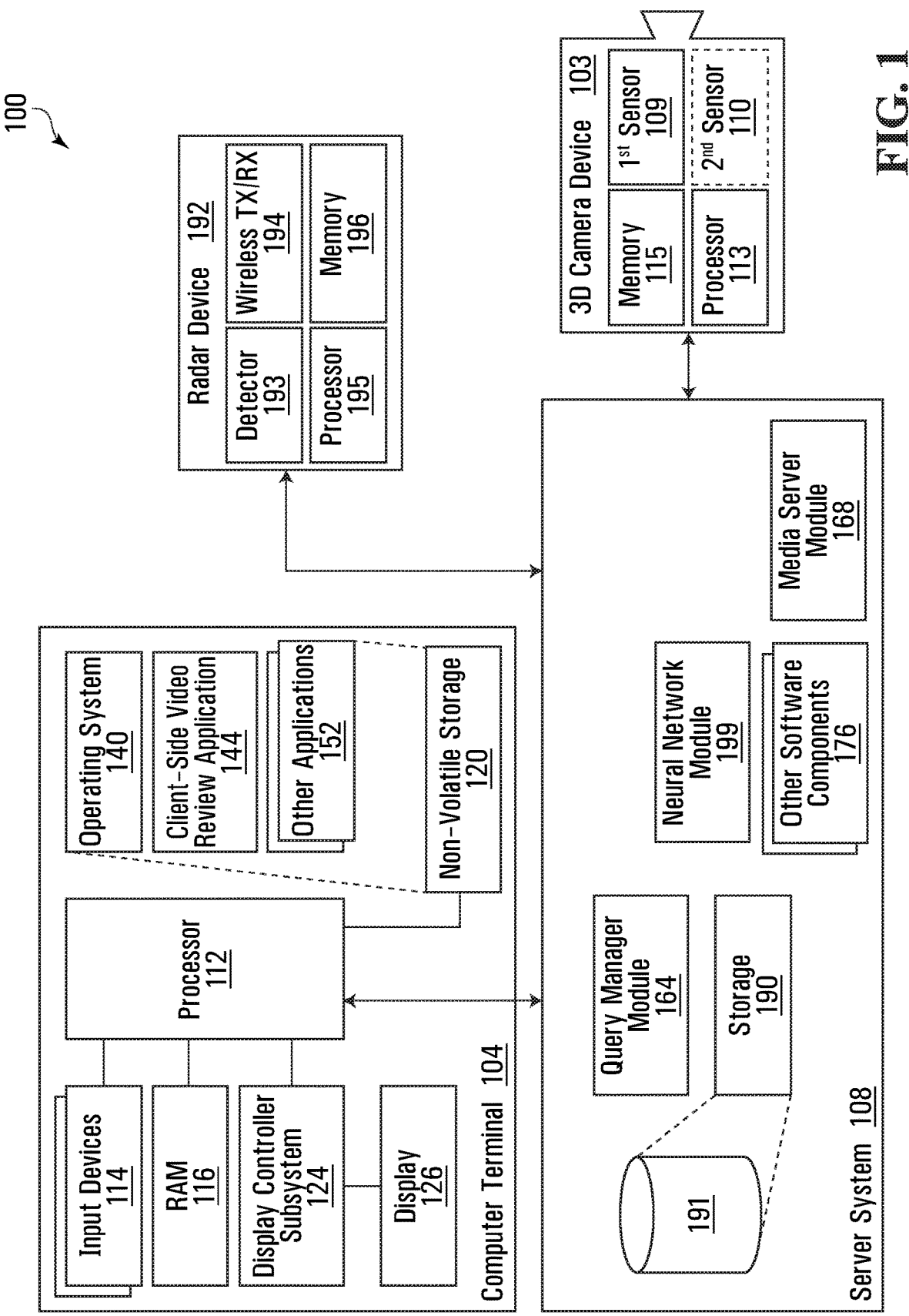
FIG. 1 shows a block diagram of an example security system within which methods in accordance with example embodiments can be carried out.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF EXAMPLE EMBODIMENTS

According to one example embodiment, there is provided a method carried out in a training system that includes at least one processor running at least one neural network and, coupled to the at least one processor: i) a calibrated radar device; and ii) a calibrated three-dimensional (3D) camera device. The method includes concurrently operating the radar device and the 3D camera device to generate training radar data and training depth data respectively. Each of the radar device and the 3D camera device has a respective field of view. The field of view of the radar device overlaps the field of view of the 3D camera device. The method also includes inputting the training radar and depth data to the neural network. The method also includes employing the training radar and depth data to train the neural network. The trained neural network is configured to receive real radar data as input and to output substitute depth data.

According to another example embodiment, there is provided an apparatus that includes a radar device configured to generate radar data, and an at least one processor coupled to the radar device. The apparatus also includes a memory communicatively coupled to the at least one processor and having stored thereon computer program code to be executed by the at least one processor. The computer program code, when executed by the at least one processor, causes the at least one processor to run a trained neural network that is configured to receive the radar data as input and to output transformed data that is emulative of depth data producible by a three-dimensional (3D) camera device.

Each of the above-mentioned embodiments will be discussed in more detail below, starting with example system and device architectures of the system in which the embodiments may be practiced, followed by an illustration of processing blocks for achieving an improved technical method, device, and system for emulating depth data of a three-dimensional camera device. Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is contemplated that any part of any aspect or embodiment discussed in this specification can be implemented or combined with any part of any other aspect or embodiment discussed in this specification.

The term "object" as used herein is understood have the same meaning as would normally be given by one skilled in the art of video analytics, and examples of objects may include humans, vehicles, animals, etc.

Further advantages and features consistent with this disclosure will be set forth in the following detailed description, with reference to the figures.

Reference is now made to FIG. 1 which shows a block diagram of an example security system 100 within which methods in accordance with example embodiments can be carried out. Included within the illustrated security system 100 are one or more computer terminals 104 and a server system 108. In some example embodiments, the computer terminal 104 is a personal computer system; however in other example embodiments the computer terminal 104 is a selected one or more of the following: a handheld device such as, for example, a tablet, a phablet, a smart phone or a personal digital assistant (PDA); a laptop computer; a smart television; and other suitable devices. With respect to the server system 108, this could comprise a single physical machine or multiple physical machines. It will be understood that the server system 108 need not be contained within a single chassis, nor necessarily will there be a single location for the server system 108. As will be appreciated by those skilled in the art, at least some of the functionality of the server system 108 can be implemented within the computer terminal 104 rather than within the server system 108.

The computer terminal 104 communicates with the server system 108 through one or more networks. These networks can include the Internet, or one or more other public/private networks coupled together by network switches or other communication elements. The network(s) could be of the form of, for example, client-server networks, peer-to-peer networks, etc. Data connections between the computer terminal 104 and the server system 108 can be any number of known arrangements for accessing a data communications network, such as, for example, dial-up Serial Line Interface Protocol/Point-to-Point Protocol (SLIP/PPP), Integrated Services Digital Network (ISDN), dedicated lease line service, broadband (e.g. cable) access, Digital Subscriber Line (DSL), Asynchronous Transfer Mode (ATM), Frame Relay, or other known access techniques (for example, radio frequency (RF) links). In at least one example embodiment, the computer terminal 104 and the server system 108 are within the same Local Area Network (LAN).

The computer terminal 104 includes at least one processor 112 that controls the overall operation of the computer terminal. The processor 112 interacts with various subsystems such as, for example, input devices 114 (such as a selected one or more of a keyboard, mouse, touch pad, roller ball and voice control means, for example), random access memory (RAM) 116, non-volatile storage 120, display controller subsystem 124 and other subsystems. The display controller subsystem 124 interacts with display 126 and it renders graphics and/or text upon the display 126.

Still with reference to the computer terminal 104 of the security system 100, operating system 140 and various software applications used by the processor 112 are stored in the non-volatile storage 120. The non-volatile storage 120 is, for example, one or more hard disks, solid state drives, or some other suitable form of computer readable medium that retains recorded information after the computer terminal 104 is turned off. Regarding the operating system 140, this includes software that manages computer hardware and software resources of the computer terminal 104 and provides common services for computer programs. Also, those skilled in the art will appreciate that the operating system 140, client-side video review application 144, and other applications 152, or parts thereof, may be temporarily loaded into a volatile store such as the RAM 116. The processor 112, in addition to its operating system functions, can enable execution of the various software applications on the computer terminal 104.

Figure 2:
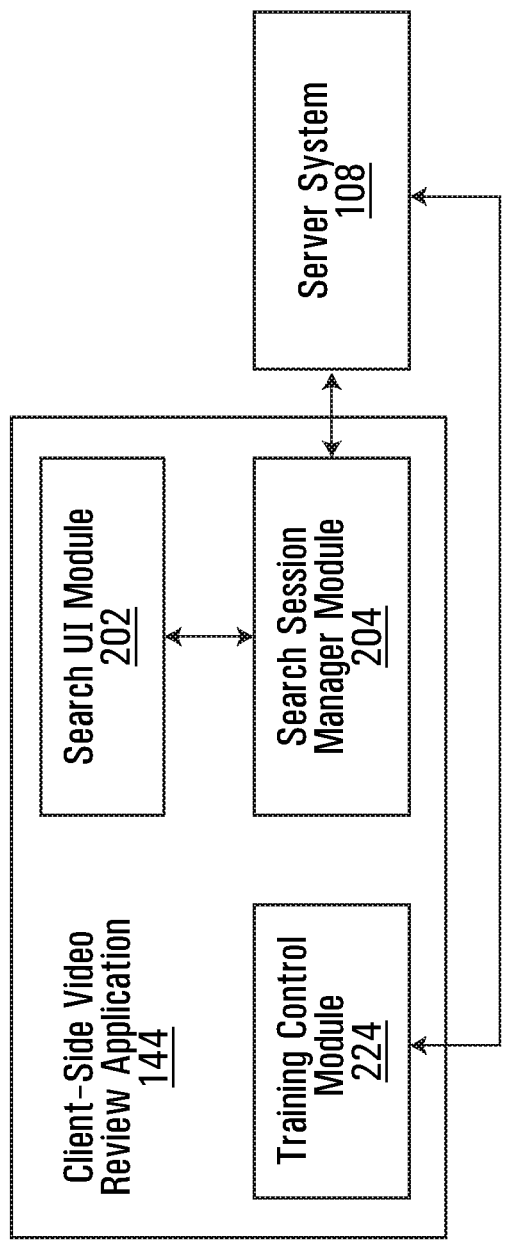
FIG. 2 shows a block diagram of a client-side video review application, in accordance with certain example embodiments, that can be provided within the example security system of FIG. 1.

Example details of the video review application 144, beyond those already described, are shown in the block diagram of FIG. 2 (provided herein for illustrative purposes without intending to comprehensive detail all typical aspects of the video review application 144). The video review application 144 can be run on the computer terminal 104 and includes a search User Interface (UI) module 202 for cooperation with a search session manager module 204 in order to enable a computer terminal user to carry out actions related to providing input in relation images, live video and video recordings (such as, for example, input to facilitate identifying same individuals or objects appearing in a plurality of different video recordings).

The video review application 144 also includes the search session manager module 204 mentioned above. The search session manager module 204 provides a communications interface between the search UI module 202 and a query manager module 164 (FIG. 1) of the server system 108. In at least some examples, the search session manager module 204 communicates with the query manager module 164 through the use of Remote Procedure Calls (RPCs). The query manager module 164 receives and processes queries originating from the computer terminal 104, which may facilitate retrieval and delivery of specifically defined video data and metadata in support of, for example, client-side video review, video export, managing event detection, etc.

The video review application 144 also includes a training control module 224. The training control module 224 is communicatively coupled to a neural network module 199 found on the server-side (i.e. within the server system 108). Further details regarding the training control module 224 and the neural network module 199 are explained subsequently herein in greater detail.

Referring once again to FIG. 1, the server system 108 includes several software components (besides the query manager module 164 already described) for carrying out other functions of the server system 108. For example, the server system 108 includes a media server module 168 (FIG. 1). The media server module 168 handles client requests related to storage and retrieval of security video taken by video cameras 169 in the security system 100.

The server system 108 also includes a number of other software components 176. These other software components will vary depending on the requirements of the server system 108 within the overall system. As just one example, the other software components 176 might include special test and debugging software, or software to facilitate version updating of modules within the server system 108. As another example of the other software components 176 may include an analytics engine component. The analytics engine component can, in some examples, be any suitable one of known commercially available software that carry out computer vision related functions as understood by a person of skill in the art.

The server system 108 also includes one or more data stores 190. In some examples, the data store 190 comprises one or more databases 191 which may facilitate the organized storing of recorded security video in accordance with example embodiments.

The illustrated security system 100 includes at least one 3D video capture device 103 (hereinafter interchangeably referred to as a "3D camera 103") being operable to capture a plurality of images and produce image data representing the plurality of captured images. The 3D camera 103 is an image capturing device and includes security video cameras.

The 3D camera 103 is a stereo camera and includes a first image sensor 109 and a second image sensor 110 for capturing a plurality of images (for example, concurrently so that captured images may be stereoscopically combined to generate depth data). The 3D camera 103 may be a digital video camera and the image sensors 109 and 110 may output captured light as a digital data. For example, the image sensors 109 and 110 may be a CMOS, NMOS, or CCD. In some embodiments, the 3D camera 103 may be an analog camera connected to an encoder. Also, although the illustrated 3D camera 103 is a stereo camera, other types of 3D cameras (including those with one instead of two image sensors) are contemplated for use within the security system 100 in the manner herein described. Other examples of suitable 3D cameras include structured light 3D cameras, time-of-flight 3D cameras and 3D Light Detection and Ranging (LiDAR) devices.

The image sensors 109 and 110 may be operable to capture light in one or more frequency ranges. For example, the image sensors 109 and 110 may be operable to capture light in a range that substantially corresponds to the visible light frequency range. In other examples, the image sensors 109 and 110 may be operable to capture light outside the visible light range, such as in the infrared and/or ultraviolet range. In other examples, the 3D camera 103 may have similarities to a "multi-sensor" type of camera, such that the 3D camera 103 includes pairs of two or more sensors that are operable to capture light in different and/or same frequency ranges.

The 3D camera 103 may be a dedicated camera. It will be understood that a dedicated camera herein refers to a camera whose principal features is to capture images or video. In some example embodiments, the dedicated camera may perform functions associated with the captured images or video, such as but not limited to processing the image data produced by it or by another camera. For example, the dedicated camera may be a security camera, such as any one of a pan-tilt-zoom camera, dome camera, in-ceiling camera, box camera, and bullet camera.

Additionally, or alternatively, the 3D camera 103 may include an embedded camera. It will be understood that an embedded camera herein refers to a camera that is embedded within a device that is operational to perform functions that are unrelated to the captured image or video. For example, the embedded camera may be a camera found on any one of a laptop, tablet, drone device, smartphone, video game console or controller.

The 3D camera 103 includes one or more processors 113, and one or more memory devices 115 coupled to the processors and one or more network interfaces. The memory device 115 can include a local memory (such as, for example, a random access memory and a cache memory) employed during execution of program instructions. The processor 113 executes computer program instructions (such as, for example, an operating system and/or application programs), which can be stored in the memory device 115.

In various embodiments the processor 113 may be implemented by any suitable processing circuit having one or more circuit units, including a digital signal processor (DSP), graphics processing unit (GPU) embedded processor, a visual processing unit or a vison processing unit (both referred to herein as "VPU"), etc., and any suitable combination thereof operating independently or in parallel, including possibly operating redundantly. Such processing circuit may be implemented by one or more integrated circuits (IC), including being implemented by a monolithic integrated circuit (MIC), an Application Specific Integrated Circuit (ASIC), a Field Programmable Gate Array (FPGA), etc. or any suitable combination thereof. Additionally or alternatively, such processing circuit may be implemented as a programmable logic controller (PLC), for example. The processor may include circuitry for storing memory, such as digital data, and may comprise the memory circuit or be in wired communication with the memory circuit, for example. A system on a chip (SOC) implementation is also common, where a plurality of the components of the 3D camera device, including the processor 113, may be combined together on one semiconductor chip. For example, the processor 113, the memory device 115 and the network interface of the 3D camera 103 may be implemented within a SOC. Furthermore, when implemented in this way, a general purpose processor and one or more of a GPU or VPU, and a DSP may be implemented together within the SOC.

In various example embodiments, the memory device 115 coupled to the processor 113 is operable to store data and computer program instructions. The memory device 115 may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, universal serial bus (USB) connected memory units, magnetic storage, optical storage, magneto-optical storage, etc. or any combination thereof, for example. The memory device 115 may be operable to store memory as volatile memory, non-volatile memory, dynamic memory, etc. or any combination thereof.

Continuing with FIG. 1, the 3D camera 103 is coupled to the server system 108. In some examples, the 3D camera 103 is coupled to the server system 108 via one or more suitable networks. These networks can include the Internet, or one or more other public/private networks coupled together by network switches or other communication elements. The network(s) could be of the form of, for example, client-server networks, peer-to-peer networks, etc. Data connections between the 3D camera 103 and the server system 108 can be any number of known arrangements, examples of which were previously herein detailed. In at least one example embodiment, the 3D camera 103 and the server system 108 are within the same Local Area Network (LAN). In some examples, the 3D camera 103 may be coupled to the server system 108 in a more direct manner than as described above.

The illustrated security system 100 also includes at least one radar device 192, which is coupled to the server system 108. In some examples, the radar device 192 is coupled to the server system 108 via one or more suitable networks. These networks can include the Internet, or one or more other public/private networks coupled together by network switches or other communication elements. The network(s) could be of the form of, for example, client-server networks, peer-to-peer networks, etc. Data connections between the radar device 192 and the server system 108 can be any number of known arrangements, examples of which were previously herein detailed. In at least one example embodiment, the radar device 192 and the server system 108 are within the same Local Area Network (LAN). In some examples, the radar device 192 may be coupled to the server system 108 in a more direct manner than as described above.

The illustrated radar device 192 includes a detector module 193, a wireless transmitter/receiver ($t_x/r_x$) 194, a processor 195 and a memory device 196. The wireless $t_x/r_x$ 194 generates and receives radio ways and includes the antenna part of the radar device 192. Where the wireless $t_x/r_x$ 194 is a multichannel transceiver, the radar device 192 can be configured to measure both distance and angle. Regarding the detector module 193, it converts the radio waves into useful information includes information regarding detected objects. The processor 195 controls overall operation of the radar device 192, which is coupled to the memory device 196 which in turn may store sensed signals and sensing rules, noting that the radar device 192 may collect unprocessed raw radar data including, but not limited to, raw reflectivity, radial velocity, spectrum width data, and distance information. Such data, which is raw and unprocessed, will be expected to contain noise. Based on environmental conditions this collected data may also contain multiple reflections. As understood by those skilled in the art, algorithms are used to process this collected data into a form that is cleaner before then employing further algorithms (for example, calculating a 3D point cloud). A data format that is suitable may be, for instance, one that is similar to NEXRAD Level II Data provided by National Weather Service (an agency of the United States federal government).

As understood by those skilled in the art, the radar device 192 may implement sensing based on active and applicable sensing rules. For example, the rules may cause the radar device 192 cease sensing during given periods such as, for example, those associated with inactivity, and carry out sensing at other periods such as, for example, those associated with activity.

Figure 3:
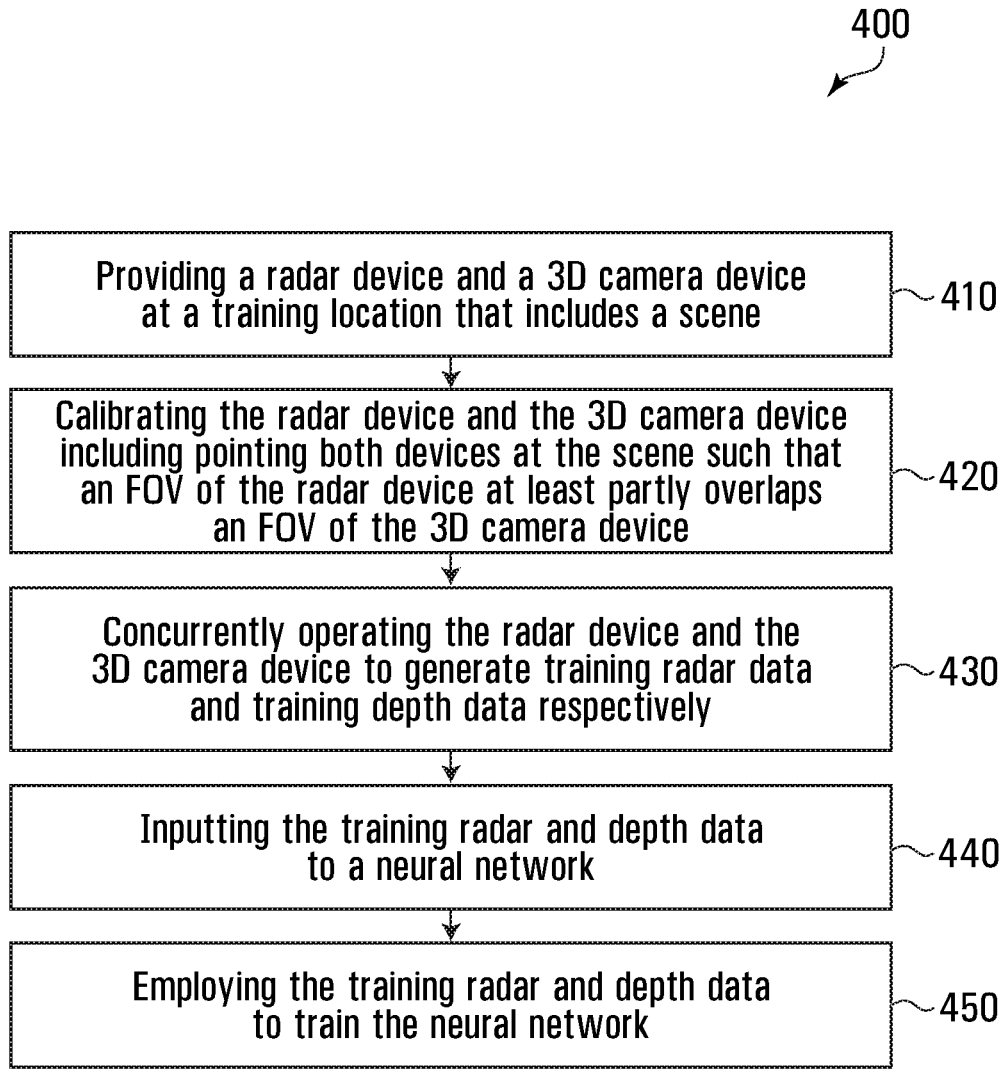
FIG. 3 is a flow chart illustrating a method for training a neural network in accordance with an example embodiment.

Reference will now be made to FIG. 3. FIG. 3 illustrates a method 400 for training a neural network (for example, a neural network running within the server system 108 shown in FIG. 1 that includes the neural network module 199).

The method 400 includes providing (410) a radar device (for example, the radar device 192) and a 3D camera device (for example, the 3D camera device 103). These devices are provided at a training location that includes a scene.

Continuing along with ongoing reference to FIG. 3, the method 400 also includes calibrating (420) the radar device and the 3D camera device. The calibrating 420 includes pointing both devices at the scene such that a coverage area (Field Of View or "FOV") of the radar device at least partly overlaps the FOV of the 3D camera device.

Next the method 400 includes concurrently operating (430) the radar device and the 3D camera device to generate training radar data and training depth data respectively.

Still with reference to FIG. 3, the method 400 also includes inputting (440) the training radar and depth data to the neural network.

The method 400 also includes employing the training (450) radar and depth data to train the neural network. Once trained, neural network is configured to receive real radar data as input and to output substitute depth data.

Figure 4:
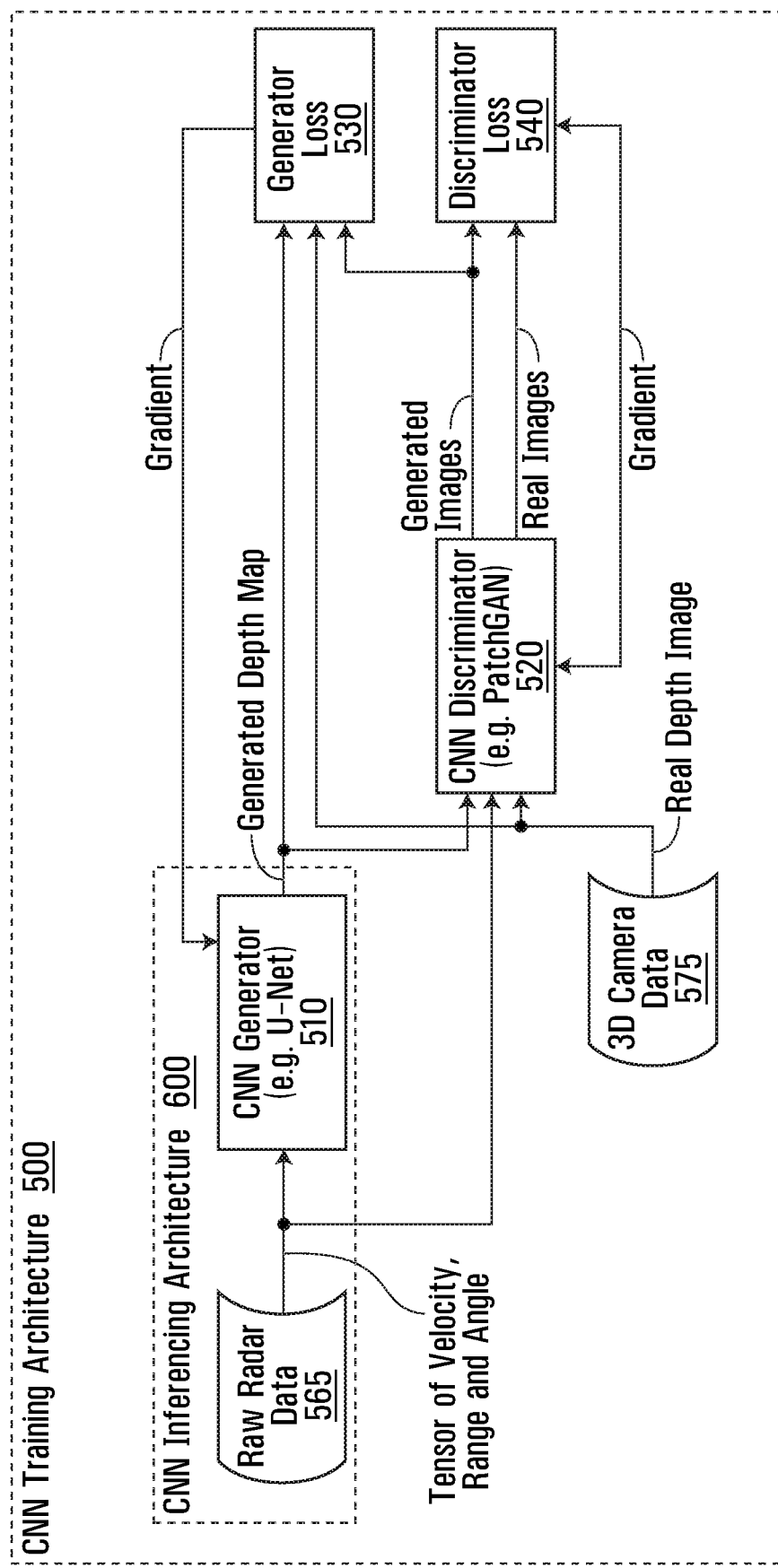
FIG. 4 is a block diagram of a neural network training architecture in accordance with an example embodiment.

FIG. 4 is a diagram providing details of a neural network training architecture 500 that may be used to implement, in accordance with an example embodiment, the method 400 of FIG. 3. In the description of the FIG. 4 architecture that follows, it will be understood that this illustrated architecture is provided for instructive and illustrative purposes, and that these instructive and illustrative details are not intended to be limiting (as those skilled in the art will appreciate, a number of suitable alternatives exist that differ from what is shown and described).

Continuing on, the illustrated neural network training architecture 500 includes a neural network generator 510, a neural network discriminator 520, a generator loss component 530 and a discriminator loss component 540. Regarding the neural network generator 510, in one example it may be a U-Net Convolutional Neural Network (CNN) or a similar CNN. In operation the neural network generator 510 receives raw radar data 565 formed of a tensor of velocity, range and angle, for example. During neural network training the neural network generator 510 also receives a gradient as input, which is outputted from the generator loss component 530. In terms of output of the neural network generator 510, this is a generated depth map which is provided to both the generator loss component 530 and the neural network discriminator 520 (in one example, the neural network discriminator 520 may be a PatchGAN CNN discriminator or a similar CNN discriminator).

Continuing on in the description of FIG. 4, within the neural network training architecture 500 three-dimensional camera data 575 (for example, real depth image data) is provided as input to the neural network discriminator 520. Also provided as input to the neural network discriminator 520 are the raw radar data 565, the generated depth map from the neural network generator 510, and a gradient from the discriminator loss component 540. In terms of output of the neural network generator 510, this is generated images provided to both the generator loss component 530 and the discriminator loss component 540, and also real images provided to the discriminator loss component 540.

In terms of the generator loss component 530, this receives as input the three-dimensional camera data 575 and the generated depth map and the generated images from the neural network generator 510 and the neural network discriminator 520 respectively. The output of the generator loss component 530 is the gradient provide to the neural network generator 510.

In terms of the discriminator loss component 540, this receives generated images and real images, outputted from the neural network discriminator 520, as input. The output of the discriminator loss component 540 is the gradient provide to the neural network discriminator 520.

Once the neural network module 199 has achieved a trained state, the 3D camera device 103 can be removed from the security system 100 (and in terms of FIG. 4 everything that is shown outside of the dashed box of the inferencing architecture 600 can be removed/disenabled as well). The trained neural network, comprised of the neural network module 199 running on at least one processor of the server system 108, is configured to receive radar data as input (from the radar device 192 which may be positioned at a different location then it was positioned during training) and to output transformed data that is emulative of depth data producible by a three-dimensional (3D) camera device. This transformed data can be provided out to the computer terminal 104 and, for example, graphically displayed within an UI of the client-side video review application 144.

Certain adaptations and modifications of the described embodiments can be made. For example, although the radar device 192 has been described as including multichannel transceiver, in at least one alternative example embodiment a single channel transceiver could be employed within the radar device, where the radar device derives data, over and additional to distance data, from reflections of transmitted signals.

As another example, with respect to the client-side video review application 144 (FIGS. 1 and 2), this has been herein described as software installed on the client terminal 104 (e.g. packaged software); however in some alternative example embodiments implementation of the UI can be achieved with less installed software through the use of a web browser application (e.g. one of the other applications 152 shown in FIG. 1). A web browser application is a program used to view, download, upload, surf, and/or otherwise access documents (for example, web pages). In some examples, the browser application may be the well-known Microsoft® Internet Explorer®. Of course other types of browser applications are also equally possible including, for example, Google® Chrome™. The browser application reads pages that are marked up (for example, in HTML). Also, the browser application interprets the marked up pages into what the user sees rendered as a web page. The browser application could be run on the computer terminal 104 to cooperate with software components on the server system 108 in order to enable a computer terminal user to carry out actions related to operating the client-side video review application 144.

As should be apparent from this detailed description, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot carry out substitute depth data generation of the type, extent and quality as herein contemplated, among other features and functions set forth herein).

Thus, specific embodiments have been described in the foregoing specification. However, one of ordinary skill in the art appreciates that various modifications and changes can be made without departing from the scope of the invention as set forth in the claims below. For example, training using spatial-temporally correlated data as herein described can be supervised or semi-supervised under control from the training control module 224, but it also contemplated that training can be carried out in an unsupervised manner as will be understood by one skilled in the art.

Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object-oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method carried out in a system that initially includes at least one processor running at least one neural network and, coupled to the at least one processor: i) a calibrated radar device; and ii) a calibrated three-dimensional (3D) camera device that includes at least one data generating sensor, and the method comprising:
    concurrently operating the radar device and the 3D camera device to generate training radar data and training depth data respectively, each of the radar device and the 3D camera device having a respective field of view, and the field of view of the radar device overlapping the field of view of the 3D camera device;
    inputting the training radar data and the training depth data to the neural network;
    employing the training radar data and the training depth data to train the neural network; and
    after the neural network is trained:
        receiving real radar data as input at the trained neural network; and
        outputting emulated depth data from the trained neural network.

2. The method as claimed in claim 1 wherein the radar device includes a multichannel transceiver, and the radar device is configured to measure both distance and angle.

3. The method as claimed in claim 1 wherein the at least one neural network is an at least one convolution neural network.

4. The method as claimed in claim 1 wherein both the training radar data and the training depth data include timestamp and spatial mapping information used to correlate the training radar and depth data when the neural network is trained.

5. The method as claimed in claim 1 wherein the real radar data is a tensor of velocity, range and angle.

6. The method as claimed in claim 1 wherein the at least one data generating sensor is a plurality of data generating sensors.

7. The method as claimed in claim 1 wherein the at least one data generating sensor is a single data generating sensor.

8. An apparatus comprising:
    a radar device configured to generate radar data;
    at least one processor coupled to the radar device; and
    a memory communicatively coupled to the at least one processor and having stored thereon computer program code to be executed by the at least one processor, wherein the computer program code, when executed by the at least one processor, causes the at least one processor to run at least one trained neural network that is configured to receive the radar data as input, without any actual depth data as additional input, and to output transformed data that is emulative of depth data producible by a three-dimensional (3D) camera device.

9. The apparatus of claim 8 further comprising a system server that houses the at least one processor.

10. The apparatus of claim 9 wherein the server system includes a storage having a database configured to store the transformed data.

11. The apparatus of claim 10 further comprising a computer terminal coupled to the server system, the computer terminal configured to run a client-side video review application which accesses the transformed data when accessibly stored in the database.

12. The apparatus of claim 8 wherein the radar device includes a multichannel transceiver, and the radar device is configured to measure both distance and angle.

13. The apparatus of claim 8 wherein the trained neural network is a trained convolution neural network.

14. The apparatus of claim 8 wherein the radar data is a tensor of velocity, range and angle.

15. The method of claim 6 wherein the plurality of data generating sensors includes a first data generating sensor operable to capture light in a first frequency range, and a second data generating sensor operable to capture light in a second frequency range different from the first frequency range.

16. The method of claim 1 wherein the radar device and the 3D camera device are coupled to a computer terminal via a server system and at least two different networks.

17. The method of claim 15 wherein the computer terminal is configured to provide training control.

18. The method of claim 1 wherein the trained neural network is configured to receive only the real radar data as input.

19. The apparatus of claim 8 wherein the least one trained neural network is configured to receive only the radar data as input.

* * * * *